US009843956B2

(12) United States Patent
Tang et al.

(10) Patent No.: US 9,843,956 B2
(45) Date of Patent: Dec. 12, 2017

(54) PRIORITIZED CELL IDENTIFICATION AND MEASUREMENT METHOD

(71) Applicant: Intel IP Corporation, Santa Clara, CA (US)

(72) Inventors: Yang Tang, Pleasanton, CA (US); Rui Huang, Beijing (CN); Candy Yiu, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/122,495

(22) PCT Filed: May 8, 2015

(86) PCT No.: PCT/US2015/029953
§ 371 (c)(1),
(2) Date: Aug. 30, 2016

(87) PCT Pub. No.: WO2015/172061
PCT Pub. Date: Nov. 12, 2015

(65) Prior Publication Data
US 2017/0078904 A1 Mar. 16, 2017

Related U.S. Application Data

(60) Provisional application No. 61/990,647, filed on May 8, 2014.

(51) Int. Cl.
*H04W 24/10* (2009.01)
*H04W 24/02* (2009.01)
(Continued)

(52) U.S. Cl.
CPC .......... *H04W 24/10* (2013.01); *H04L 5/0048* (2013.01); *H04W 24/02* (2013.01); *H04W 72/0453* (2013.01)

(58) Field of Classification Search
CPC .... H04L 5/0048; H04W 24/02; H04W 24/10; H04W 72/0453
See application file for complete search history.

(56) References Cited

U.S. PATENT DOCUMENTS 6,907,228 B1 6/2005 Lohtia et al.
2011/0111754 A1 5/2011 Sharaga et al.
(Continued)

OTHER PUBLICATIONS

3GPP TS 36.133 v. 12.3.0, "3GPP; TSG RAN; Evolved Universal Terrestrial Radio Access (E-UTRA); Requirements for support of radio resource management (Release 12)", Mar. 27, 2014, 139 pages.
(Continued)

*Primary Examiner* — Khaled Kassim
(74) *Attorney, Agent, or Firm* — International IP Law Group, P.L.L.C.

(57) ABSTRACT

A prioritized cell identification and measurement method is disclosed. The method classifies frequency layers to be monitored and measured by an user equipment into normal- and reduced-performance groups. Several different embodiments are described. Where appropriate, the corresponding signaling design is also suggested. User equipment can adopt one or several of these embodiments, and can change configurations in a semi-static manner based on operating conditions.

15 Claims, 11 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 2013/0010630 A1 | 1/2013 | Jeong et al. | |
| 2013/0267246 A1 | 10/2013 | Wang et al. | |
| 2014/0146697 A1* | 5/2014 | Kim | H04B 7/0413 370/252 |
| 2015/0050889 A1* | 2/2015 | Axmon | H04W 24/08 455/67.11 |
| 2015/0050890 A1* | 2/2015 | Axmon | H04W 24/08 455/67.11 |
| 2015/0245235 A1* | 8/2015 | Tang | H04W 36/0088 370/252 |
| 2015/0327104 A1* | 11/2015 | Yiu | H04W 24/10 455/450 |
| 2016/0081020 A1* | 3/2016 | Rahman | H04W 76/025 370/311 |
| 2016/0112149 A1* | 4/2016 | Kim | H04B 17/309 370/252 |
| 2016/0192339 A1* | 6/2016 | Axmon | H04W 24/10 370/329 |
| 2016/0269919 A1* | 9/2016 | Kazmi | H04W 36/0094 |
| 2016/0301517 A1* | 10/2016 | Da | H04L 7/0037 |
| 2017/0055202 A1* | 2/2017 | Uchiyama | H04W 24/10 |
| 2017/0070312 A1* | 3/2017 | Yi | H04J 11/0036 |
| 2017/0201961 A1* | 7/2017 | Siomina | H04W 64/00 |
| 2017/0223667 A1* | 8/2017 | Yi | H04W 72/04 |

OTHER PUBLICATIONS

RAN 4, R4-145402, "Way forward for IncMon", Dresden, Germany, Aug. 18-22, 2014, 5 pages.

Qualcomm Incorporated, "Measurement requirements to monitor additional UTRA carriers in Idle/URA_PCH/CELL_PCH states", R4-141481, 3GPP TSG-WG4 Meeting #70bis, San Jose Del Cabo, Mexico, Apr. 9, 2014, 6 pages.

International Search Report and Written Opinion Received for PCT Patent Application No. PCT/US2015/029953, dated Aug. 19, 2015, 9 pages.

Ericsson, "RRM Requirements for Increased Carrier Monitoring in E-UTRA Connected State", R4-141871, 3GPP TSG-RAN WG4 Meeting #70bis, San Jose del Cabo, Mexico, Mar. 31-Apr. 4, 2015, 7 pages.

Intel Corporation, "Further Considerations on the Measurement Gap Pattern in HeNet", R4-140613, 3GPP TSG RAN Meeting WG4 #70, Prague, Czech Republic, Feb. 10-14, 2014, 7 pages.

* cited by examiner

PRIORITIZED CELL IDENTIFICATION AND MEASUREMENT METHOD

CROSS-REFERENCE TO RELATED APPLICATIONS

This application is a continuation of U.S. Provisional Patent Application Ser. No. 61/990,647, filed on May 8, 2014, and of PCT Patent Application, Serial Number PCT/US2015/029953, filed on May 8, 2015.

TECHNICAL FIELD

This application relates to measurements taken by user equipment operating under the long term evolution (LTE) standard.

BACKGROUND

The evolved packet core (EPC) is the core network of advanced mobile communications systems. The EPC allows different radio access technology (RATs) to operate in an integrated manner. These radio access technologies include first generation wireless local area networks (LANs), second generation (2G) systems, such as global system for mobile communication, or GSM, third generation systems (3G), such as the universal mobile telecommunication system (UMTS), and fourth generation systems (4G) such as long-term evolution (LTE). LTE is a specification promulgated by the $3^{rd}$ Generation Partnership Project, hereinafter, "3GPP specification".

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency division multiplexing (OFDM) for signal transmission include the LTE (3GPP), the Institute of Electrical and Electronics Engineers (IEEE) 802.16 standard (e.g., 802.16e, 802.16m), which is commonly known to industry groups as WiMAX (worldwide interoperability for microwave access), and the IEEE 802.11 standard, which is commonly known to industry groups as WiFi.

In 3GPP radio access network (RAN) LTE systems, the node can be a combination of evolved universal terrestrial radio access network (E-UTRAN) NodeBs (also commonly denoted as evolved NodeBs, enhanced NodeBs, eNodeBs, or eNBs), and radio network controllers (RNCs). The eNBs communicate with a wireless device known as an user equipment (UE). The DL transmission can be a communication from the node (e.g., the eNB) to the wireless device (e.g., the UE), and the UL transmission can be a communication from the wireless device to the node.

A UE such as a cellphone can support multiple RATs, known as a multi-mode UE. Only one RAT is operable at a time in the multi-mode UE. A multi-mode UE 50 that is said to be "camped" on one RAT is utilizing only the technology of that RAT. The UE can be switched from one RAT to another, thus switching where the UE is camped. Thus, the multi-mode UE can be camped on LTE, get switched from the 4G RAT to the 3G RAT, and is thereafter camped on UMTS.

Under carrier aggregation, the UE can simultaneously communicate with two different RATs. Thus, the UE is able to concurrently utilize radio resources from multiple carrier frequencies.

In homogeneous networks, the eNB, also called a macro node or macro eNB, can provide basic wireless coverage to wireless devices in a cell. The cell can be the physical region or area inside which the wireless devices are operable to communicate with the macro eNB. Heterogeneous networks (HetNets) can be used to handle the increased traffic loads on the macro nodes due to the increased usage and functionality of wireless devices. HetNets can include a layer of planned high-power macro eNBs overlaid with layers of lower power nodes (small-eNBs, micro-eNBs, pico-eNBs, femto-eNBs, or home eNBs (HeNBs)) that can be deployed in a less well-planned or even entirely uncoordinated manner within the coverage area (cell) of a macro node. The lower power nodes (LPNs) can generally be referred to as "low power nodes", small nodes, or small cells.

The macro node can be used for basic coverage. The low power nodes can be used to fill coverage holes, to improve capacity in hot zones or at the boundaries between the macro nodes' coverage areas, and to improve indoor coverage where building structures impede signal transmission. Inter-cell interference coordination (ICIC) or enhanced ICIC (eICIC) can be used for resource coordination to reduce interference between the nodes, such as macro nodes and low power nodes, in a HetNet.

HetNets can use time-division duplexing (TDD) or frequency-division duplexing (FDD) for downlink or uplink transmissions. TDD is an application of time-division multiplexing (TDM) to separate downlink and uplink signals. In TDD, DL and UL signals can be carried on the same carrier frequency, where the DL signals use a different time interval from the UL signals. Thus, the DL signals and the UL signals do not generate interference with each other. TDM is a type of digital multiplexing in which two or more bit streams or signals, such as a DL or UL signal, are transferred apparently simultaneously as sub-channels in one communication channel, but are physically transmitted on different time resources. In FDD, a UL transmission and a DL transmission can operate using different frequency carriers. In FDD, interference can be avoided because the DL signals use a different frequency carrier from the UL signals.

Time-division duplexing (TDD) offers flexible deployments without requiring a pair of spectrum resources. Long-term evolution (LTE) TDD allows for asymmetric uplink-downlink (UL-DL) allocations.

As the UE operates in a wireless neighborhood, the channel conditions change. This can be due to movement by the UE, the presence of buildings and vehicles in the line of sight of the UE, and other conditions such as, for example, interference from neighboring stations, etc. Channel state information (CSI) is data about the channel conditions and is provided to the eNB by the UE during wireless communication. CSI includes channel quality information (CQI), pre-coding matrix indication, rank indication, and other characteristic information about the wireless channel.

The 3GPP organization includes several working groups dedicated to particular tasks under LTE. Radio access network 1 (RAN1) is responsible for defining the physical layer; RAN2 deals with radio interface protocols on top of the physical layer; RAN3 pertains to the overall UTRAN (EUTRAN) architecture; RAN4 is dedicated to the RF conformance aspects of UTRAN (EUTRAN), test specifications for radio network and terminal equipment regarding RF transmission and reception performance; and RAN5 pertains to radio interface conformance test specification, test specifications based on RAN4 specifications, and signaling procedures defined by other groups such as RAN2.

Under the LTE specification, the UE monitors a frequency (also known as a layer, frequency layer, carrier, or band) for the serving primary cell (pcell) of the UE as well as for a secondary cell (scell) of the UE. While being serviced by the pcell, the UE remains on the pcell frequency. The pcell frequency layer and the scell frequency layer are monitored at a first rate.

Additionally, the UE monitors other frequencies, including other RATs, at a second, lower rate, such that, if handover to a different frequency band (in the case of inter-RAT monitoring) or switching to a different RAT, such as USTM (3G) or WiFi (2G) becomes necessary, the UE knows the characteristics of these frequency layers.

Previously under LTE, the UE was expected to monitor eight or more frequency layers. Under recent RAN4 modifications (RAN4, release 12), the minimum number of frequency layers in EUTRAN to be monitored has increased from eight to thirteen.

Thus, there is a need for a cell identification and measurement method that addresses the RAN4 release 12 requirements.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a prioritized cell identification and measurement, or PCIM, method is disclosed. The PCIM method classifies frequency layers to be monitored and measured by an user equipment into high- and reduced-performance groups. Several different embodiments are described. Where appropriate, the corresponding signaling design is also suggested. User equipment can adopt one or several of these embodiments, and can change configurations in a semi-static manner based on operating conditions.

In the following detailed description, reference is made to the accompanying drawings, which show by way of illustration specific embodiments in which the subject matter described herein can be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 1:
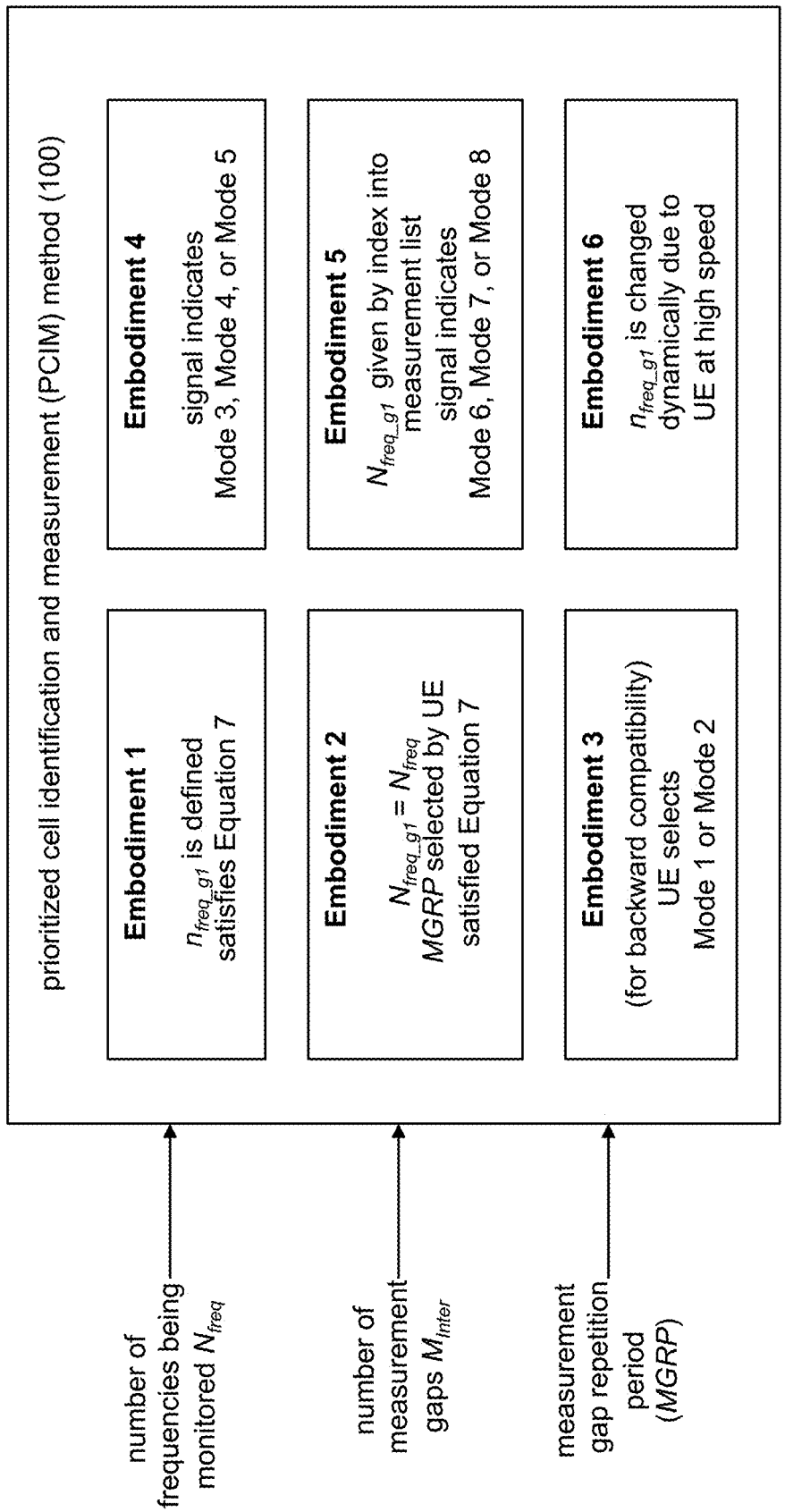
FIG. 1 is a simplified block diagram of a prioritized cell identification and measurement (PCIM) method, according to some embodiments.

FIG. 1 is a conceptual diagram of a prioritized cell identification and measurement (PCIM) method 100, according to some embodiments. The PCIM method 100 receives three parameters as input, a number of frequency layers being monitored, given as $N_{freq}$, a number of measurement gaps, given as $M_{Inter}$, and a measurement gap repetition period (MGRP). The PCIM method 100 includes six possible embodiments, described herein.

Figure 2:
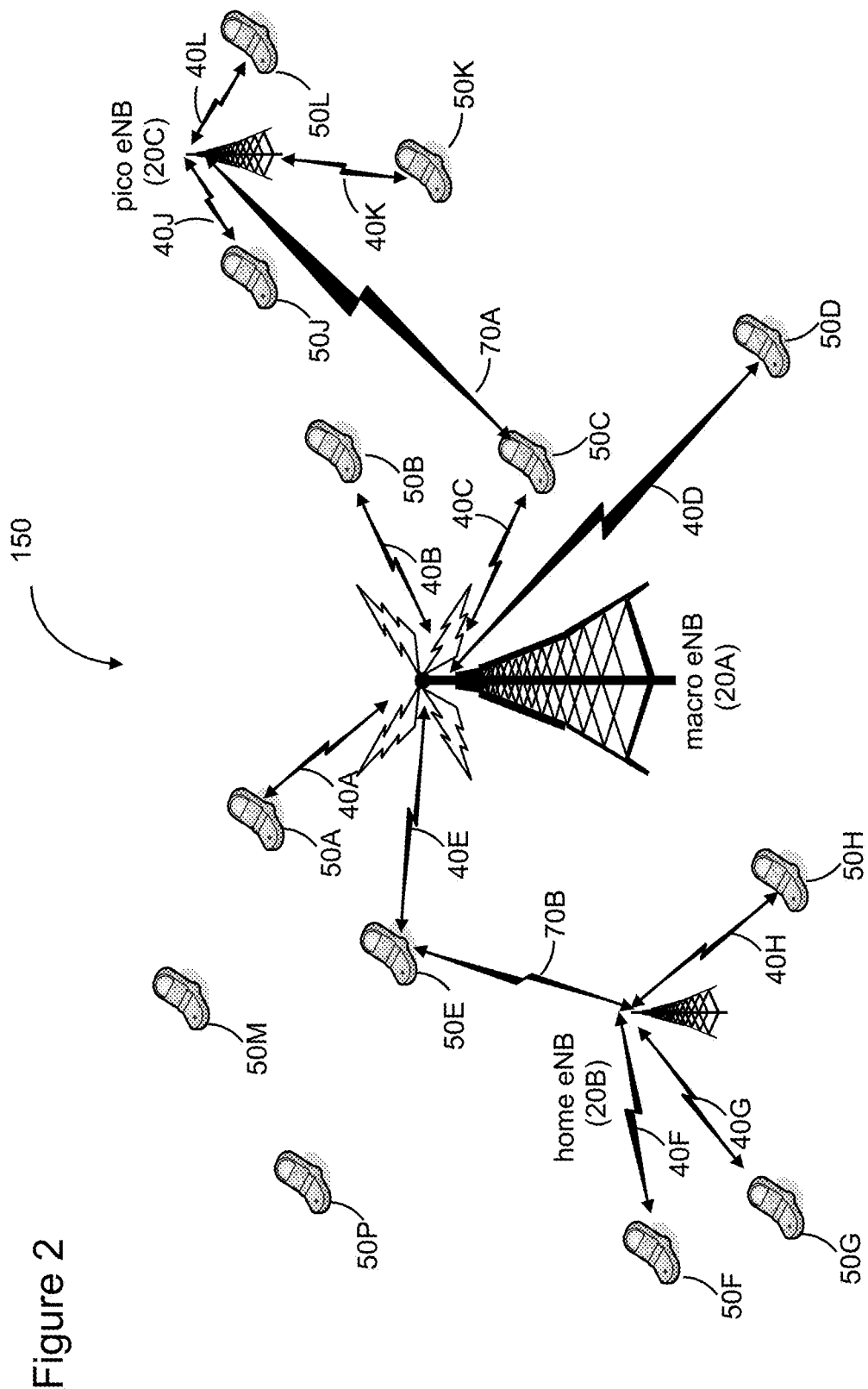
FIG. 2 is a simplified diagram of a wireless network, according to some embodiments.

FIG. 2 is a simplified diagram of a wireless network 150, consisting of a single macro eNB 20A, a home eNB 20B, and a pico eNB 20C (collectively, "eNBs 20"). The wireless network 150 also features thirteen UEs 50A-50P (collectively, "UEs 50"), many of which have established a connection to one of the eNBs 20 (indicated with arrows). Connections 40A-40L are the frequency layers between the UEs 50 and their respective eNBs 20, and are thus the serving frequency layers (collectively, "serving frequency layers 40").

The macro eNB 20A can serve as the serving base station (pcell) for several UEs 50. In FIG. 2, the macro eNB 20A is the pcell for UEs 50A-50E with connections 40A-40E, respectively. The home eNB 20C is the pcell for UEs 50F-50H, with connections 40F-40H, respectively. The pico eNB 20C is the pcell for UEs 50J-50L, with connections 40J-40L, respectively.

The home eNB 20C or the pico eNB 20C can further serve as the secondary base station (scell) for one or more UEs. In FIG. 2, the UE 50C has pcell connection 40C but also scell connection 70A to the pico eNB 20C. The UE 50E has pcell connection 40E but also scell connection 70B to the home eNB 20B (collectively, "secondary frequency layers 70").

The UEs 50 are depicted in FIG. 2 as cellular phones, but can also be laptop computers, tablets, smartphones, or other wireless devices. In addition to connection between a UE 50 and an eNB 20, some UEs can communicate device-to-device within the wireless network 150, and such communication can be in the form of unicast, broadcast, or multi-hop transmissions (not shown).

The PCIM method 100 includes embodiments to enable the UE in a 4G LTE wireless neighborhood or heterogeneous network to perform measurements of frequency layers (also referred to herein as frequencies, bands, connections, or carriers). Terms such as detect, identify, synchronize, monitor, and measure are used herein to describe what the UE is doing with the frequency layers. The terms "measure", "measurement", and "measuring" when used herein are meant to imply that the UE has already performed the necessary detection, identification, synchronization, and monitoring that would precede any possible measurement of the frequency layer being conducted. Some aspects of these operations are omitted herein, as they are outside the scope of this disclosure.

The frequency layers 40 and the secondary frequency layers 70 are monitored by the UEs 50 regularly, and are not the subject of the PCIM method 100. Instead, the PCIM method 100 pertains to other frequency layers to measured, including both inter-frequency layers and inter-RAT frequency layers. The inter-frequency layers are the various frequency layers within the current RAT in which the UE 50 operates. As examples, in addition to monitoring pcell band 40C and scell band 70A, the UE 50C in FIG. 2 can detect and measure the frequency layer between itself and the home eNB 20B; similarly, in addition to monitoring pcell band 40E and scell band 70B, the UE 50E can detect and measure the frequency layer between itself and the pico eNB 20C (not shown).

The inter-RAT measurements are the measurements outside the current RAT. Thus, for example, when the UE 50 is operating in the 4G RAT, an inter-RAT measurement would be a measurement of the 3G RAT (e.g., UMTS) or the 2G (WiFi) RAT, known as a wireless local area network (WLAN).

Figure 3:
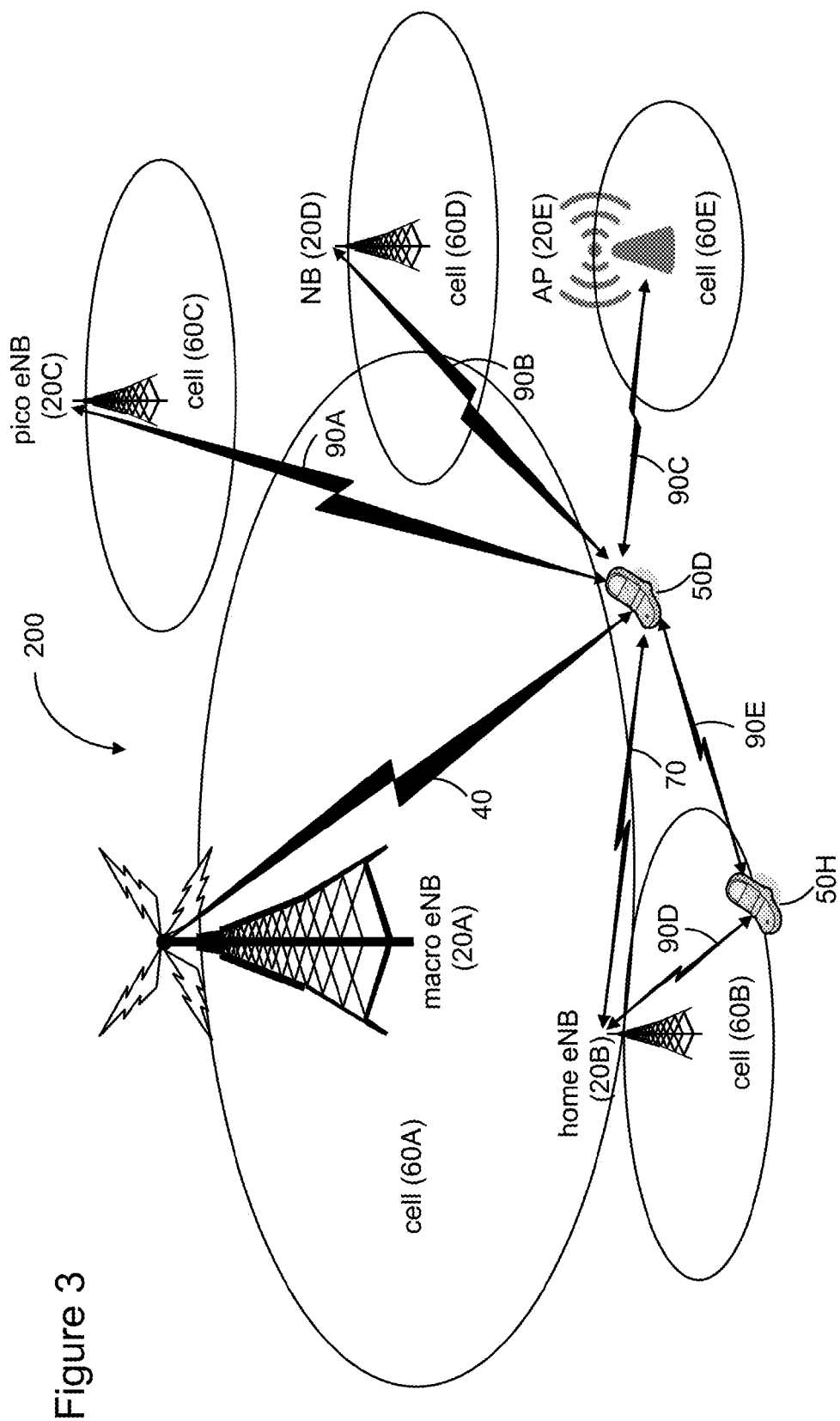
FIG. 3 is a simplified diagram of a heterogeneous wireless network for implementing the PCIM method of FIG. 1, according to some embodiments.

FIG. 3 is a simplified diagram of a HetNet 200, which is also a wireless network. A single UE 50D is depicted. The HetNet 200 includes physically or logically co-located LTE, UMTS, and WLAN cells. As before, there are three LTE-capable enhanced (4G) base stations, the macro eNB 20A, the home eNB 20B, and the pico eNB 20C.

The cells are the coverage area of a given wireless base station. Whereas in a 4G network, the base station is an enhanced node B (eNB), in a 3G network, the base station is known as a cellular access point or a node B (NB). In the case of WiFi, the base station is known as an access point (AP). The cell coverage area of each base station is approximately shown as an oval shape. Macro eNB 20A has cell area 60A; similarly, home eNB 20B has a cell area 60B and pico eNB 20C has a cell area 60C.

Since the HetNet 200 is heterogeneous, it is expected to have cells that are not strictly part of the 4G LTE RAT. FIG. 3 shows a 3G base station denoted node B (NB) 20D, which covers a cell 60D and a WiFi base station, AP 20E, having WiFi cell 60E (collectively, "cell area 60" or "cell 60").

From the UE's perspective, the macro eNB 20A is its primary base station and the home eNB 20B is its secondary base station.

Thus, the pcell and scell frequency layers 40A and 40B, respectively, associated with the primary base station and secondary base station PSS and are not the subject of the PCIM method 100.

Instead, FIG. 3 shows three frequency layers of interest. First, frequency layer 90A is an inter-frequency layer. Like pcell frequency layer 40 and scell frequency layer 70, frequency layer 90A operates in the LTE 4G network and connects to an enhanced node B 20C. Frequency layer 90B, by contrast, is an inter-RAT frequency layer because it operates in a 3G network and connects to a (not enhanced) node B 20D. Frequency layer 90C is also an inter-RAT frequency layer because it operates in a WiFi network and connects to an AP 20E. Frequency layer 90D is a band between home eNB 20B and UE 50H, and is thus an inter-RAT frequency layer (with the characterization being from the perspective of the UE 50D). Frequency layer 90E is a device-to-device connection between UE 50D and UE 50H. Thus, both frequency layers that directly impact UE 50D (90A, 90B, 90C, and 90E) as well as frequency layers that have nothing to do with the UE (90D) are part of the measurable frequency layers that are being considered herein (collectively, "frequency layers to be measured 90" or simply "frequency layers 90"). In some embodiments, the measurable frequency layers are limited to those between a base station (nB, eNB, or AP) and a UE. In other embodiments, the measurable frequency layers include device-to-device bands, such as frequency layer 90E.

When engaging in frequency layer detection (synchronization) and measurement, the UE 50D can be said to be performing "cell identification". Cell identification is thus just another way to describe the frequency layer measuring done by the UE. Thus, the method described herein is known as a prioritized cell identification and measurement, PCIM.

In discussing the PCIM method 100, reference is made to the UE 50, which can be any one of the UEs depicted in FIG. 2 or 3. The eNB 20 referenced in the description below may be any type of LTE-capable base station. The frequency layers to be measured are frequency layers 90, as illustrated in FIG. 3, and not the scell 40 or pcell 70 frequency layers.

Based on the RAN4, release 12 requirements (referred to herein as "new RAN4"), both measurement and reporting delay conducted by the UE 50 is proportional to the number of monitored frequency layers 90, except the serving frequency layers (e.g., pcell 40 and scell 70 frequency layers in FIG. 3). Thus, when the minimum number of frequency layers 90 being monitored increases, an increased delay is expected. The inherent delay due to the increased number of frequency layers 90 to monitor can be problematic, especially when the mobility of the UE 50 is high.

From a throughput and power consumption perspective, an increased number of frequency layers to monitor unnecessarily results in higher power consumption and/or throughput loss (e.g., in non-DRX mode), under the new RAN4 procedure. DRX mode, short for discontinuous reception mode, is a power-saving feature of the UE in which the UE, while idle, listens for a paging message (such as incoming call, system information change, and so on), not at the default rate (every 1 ms), but instead at a reduced rate (e.g., every 60 ms), in order to mitigate loss of battery power in the UE. As a result, the challenge that comes with increasing the number of frequency layers to monitor includes how to re-balance the delay, measurement accuracy, and the measurement gap length per measurement gap repetition period (MGRP).

Figure 4:
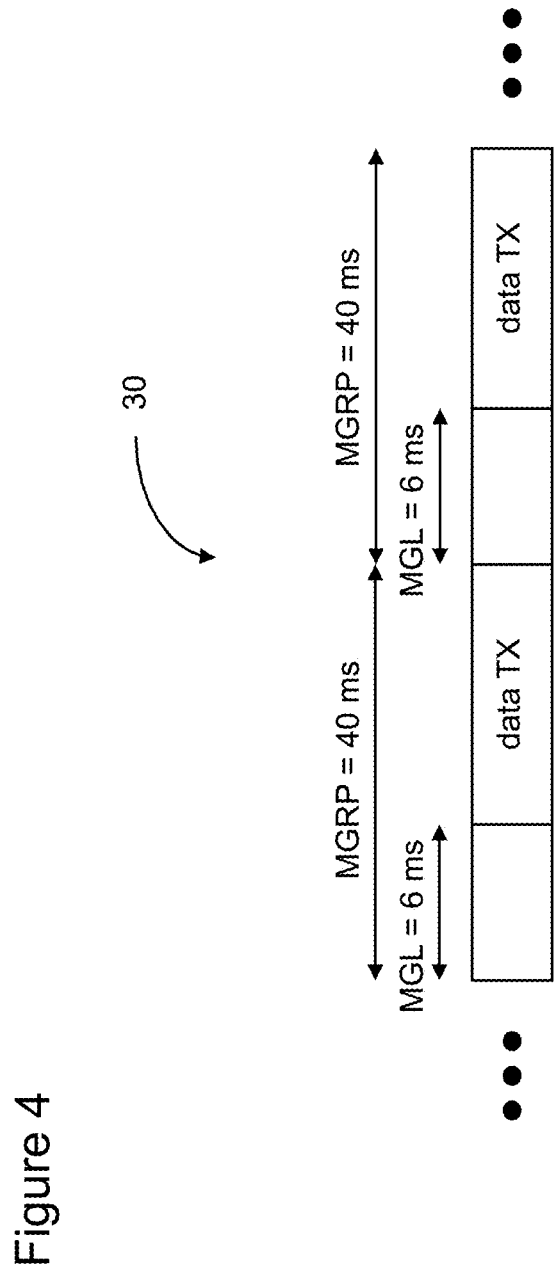
FIG. 4 is a diagram of a measurement gap repetition period used by the PCIM method of FIG. 1, according to some embodiments.

FIG. 4 is a simplified diagram showing a portion of a hypothetical wireless transmission 30. A measurement gap length (MGL) of 6 milliseconds (ms) is shown, followed by a data transmission, then followed by another MGL of 6 ms, and so on. The transmission 30 of FIG. 4 has a MGRP of 40 ms. Other transmissions can have a MGRP of 80 ms. The MGRP is the periodicity (density) of measurements being taken by the UE 50.

In new RAN4, it has been agreed the performance requirements for increased frequency layer monitoring are divided into two performance groups, denoted as normal-performance and reduced-performance groups, respectively. Different performance requirements are to be defined by new RAN4 for the normal-performance group frequency layers and the reduced-performance group frequency layers.

In some embodiments, the PCIM method 100 satisfies two criteria: minimizing the overall measurement delay that results from the UE measuring more frequency layers 90 than in legacy UEs, and achieving backward compatible performance by the UE 50 relative to legacy UEs. As used herein, a legacy UE is an LTE UE that identifies and measures up to eight frequency layers, whereas the UE 50 identifies and measures up to thirteen frequency layers 90

(including the pcell band 40 and, if present, the scell band 70). The UE 50 described herein thus satisfies the new RAN4 requirements.

The minimum number of frequency layers 90 being monitored by the UE 50, given by $N_{freq}$, has increased from eight (legacy UE) to thirteen (new RAN4 requirement). Thus, for the new RAN4, $N_{freq} \leq 13$. A first normal-performance group, denoted g1, consists of a first number, $N_{freq\_g1}$ of frequency layers being monitored by the UE 50 (also known as the normal-performance group size). A second reduced-performance group, denoted g2, consists of a second number, $N_{freq\_g2}$ of frequency layers 90 being monitored by the UE (reduced-performance group size).

Without loss of generality, the maximum cell identification delay for inter-frequency measurements, given by $T_{Identify\_inter\_g1}$ and $T_{identify\_inter\_g2}$ for high- and reduced-performance groups, respectively is given as:

$$T_{Identify\_Inter\_g1} = T_{Basic\_Indentify\_Inter} \cdot \frac{480}{5 \cdot M_{Inter\_g1}} \cdot N_{freq\_g1} \quad (1a)$$

$$T_{Identify\_Inter\_g2} = T_{Basic\_Indentify\_Inter} \cdot \frac{480}{5 \cdot M_{Inter\_g2}} \cdot N_{freq\_g2} \text{ where} \quad (1b)$$

$$M_{Inter\_g1} + M_{Inter\_g2} = \frac{480}{MGRP} \text{ and} \quad (2)$$

$$N_{freq\_g1} + N_{freq\_g2} = N_{freq} \quad (3)$$

Equations 1a and 1b (collectively, "equation 1") represent the minimum requirement (maximum time) available to the UE 50 for measuring a frequency layer 90 for a first normal-performance group, g1, and a second reduced-performance group, g2, respectively. $T_{Basic\_Identify\_Inter}$ is the maximum cell identification delay available to the legacy UE. $M_{inter\_g1}$ and $M_{inter\_g2}$ are the number of measurement gaps for the high- and reduced-performance groups, respectively; in other words, $M_{inter\_g1}$ and $M_{inter\_g2}$ are the number of measurement opportunities per 480 ms (the density of measurements being performed). ($M_{inter\_g1}$ and $M_{inter\_g2}$ are also known herein as the resource assignment for the high- and reduced-performance groups, respectively.) FIG. 4, above, illustrates the MGRP and MGL for LTE transmissions.

On average, $M_{inter\_g1}$ and $M_{inter\_g2}$ represent the number of measurement gaps assigned to the high- and reduced-performance groups, respectively, per 480 ms. Also, $N_{freq\_g1}$ and $N_{freq\_g2}$ represent the number of frequencies 90 being monitored in the high- and reduced-performance groups, respectively, excluding the pcell band 40, such as the macro eNB 20A, and the scell band 70, such as the pico eNB 20C (FIG. 2), both of which are being monitored periodically by the UE 50.

From Equation 1, it is shown that both the number of measurement gaps, $M_{inter\_g1}$ ($M_{inter\_g2}$) and the maximum cell identification delay, $T_{Identify\_inter\_g1}$ ($T_{identify\_inter\_g2}$) are proportional to the number of monitored frequency layers 90, $N_{freq\_g1}$ ($N_{freq\_g2}$), except the frequency layers of the serving eNBs (pcell and scell). Thus, when the minimum number of frequency layers 90 being monitored, $N_{freq}$, increases, an increased delay is expected.

In the LTE specification, the UE 50 typically has two different measurement opportunities. First, there are twelve measurement gaps per 480 ms; thus, every 40 ms there is one measurement gap and thus one measurement opportunity (480 ms/12=40 ms). Second, there are six measurement gaps per 480 ms; thus, every 80 ms there is one measurement gap/opportunity (480 ms/6=80 ms). Thus, $M_{inter\_g1}$ and $M_{inter\_g2}$ can be thought of as the measurement density for high- and reduced-performance groups, respectively. The MGRP shown in FIG. 4 is the periodicity of the measuring performed by the UE 50.

The measurements being taken by the UE 50 of the frequency layers are between the UE 50 and other entities in the wireless HetNet 200, as illustrated in FIG. 3. Each measurement calculates some characteristic of the frequency layer 90. Generally, this characteristic is the signal to interference plus noise ratio, or SINR. In the LTE environment, SINR is effectively obtained by measuring both reference signal received power (RSRP), which can be thought of as signal strength, and reference signal received quality (RSRQ), which is essentially the interference of the frequency layer 90.

For RSRP and RSRQ measurements, the physical layer measurement periods, $T_{measurement\_period\_Inter\_FDD\_g1}$ and $T_{measurement\_period\_Inter\_FDD\_g2}$, are defined for the high- and reduced-performance groups, respectively, given as:

$$T_{Measurement\_Period\_Inter\_FDD\_g1} = \quad (4a)$$
$$\begin{cases} 480 \cdot \dfrac{480}{MGRP \cdot M_{Inter\_g1}} \cdot N_{freq\_g1}, & BW_{measure} = 6RB \\ 240 \cdot \dfrac{240}{MGRP \cdot M_{Inter\_g1}} \cdot N_{freq\_g1}, & BW_{measure} = 50RB \end{cases}$$

$$T_{Measurement\_Period\_Inter\_FDD\_g2} = \quad (4b)$$
$$\begin{cases} 480 \cdot \dfrac{480}{MGRP \cdot M_{Inter\_g2}} \cdot N_{freq\_g2}, & BW_{measure} = 6RB \\ 240 \cdot \dfrac{240}{MGRP \cdot M_{Inter\_g2}} \cdot N_{freq\_g2}, & BW_{measure} = 50RB \end{cases}$$

where $BW_{measure}$ denotes the measurement bandwidth and RB is the resource block. The smallest modulation structure in LTE is the resource element (RE), which is defined as one 15 kHz subcarrier having a width of one symbol. A resource block consists of twelve subcarriers multiplied by six (or seven) symbols.

Assumptions

For each frequency layer 90 being monitored, the UE 50 first performs identification, then takes a measurement. Identification is also known as synchronization, in which the UE 50 detects the synchronization symbol for the frequency layer 90. In LTE, the synchronization symbol is given as a primary synchronization symbol (PSS) or a secondary synchronization symbol (SSS). Only after synchronization occurs can the UE 50 perform measurements of the frequency layer 90.

In some embodiments, the PCIM method 100 ensures that the frequency layers 90 being measured in the normal-performance group enjoy tighter requirements than the frequency layers in the reduced-performance group. As indicated above, $T_{identiyg\_Inter\_g1}$ and $T_{Identify\_Inter\_g2}$ are time periods in which the UE 50 is able to identify the cell. Thus, a shorter time period is preferred. In some embodiments, a first assumption is given by the following formula:

$$T\text{Identify\_Inter\_g1} \leq T\text{Identify\_Inter\_g2} \quad (5)$$

Equation 5 indicates a preference for the UE 50 to identify the frequency layer 90 faster in the normal-performance group, g1, than in the reduced-performance group, g2.

Recall also that $T_{measurement\_Period\_Inter\_FDD\_g1}$ and $T_{measurement\_Period\_Inter\_FDD\_g2}$ are time periods in which the UE 50 measures the characteristics (RSRP and RSRQ) of the identified frequency layers 90. Again, a shorter time period is preferred. Thus, in some embodiments, a second assumption is given by the following formula:

$$T_{Measuremed\_Period\_Inter\_FDD\_g1} T_{Measurement\_Period\_Inter\_FDD\_g2} \quad (6)$$

EQUIVALENT FUNCTION

In some embodiments, using Equations 1-3, above, an equivalent function is given as:

$$\frac{N_{freq\_g1}}{M_{Inter\_g1}} \leq \frac{N_{freq} - N_{freq\_g1}}{\frac{480}{MGRP} - M_{Inter\_g1}} \Rightarrow \frac{N_{freq\_g1}}{M_{Inter\_g1}} \leq \frac{N_{freq}}{\frac{480}{MGRP}} = \frac{N_{freq} \cdot MGRP}{480} \quad (7a)$$

Equation 7a can be restated as:

$$\frac{N_{freq\_g1}}{M_{Inter\_g1}} \leq \frac{N_{freq} \cdot MGRP}{480} \quad (7)$$

Using Equations 2 and 3, as well as the assumptions given in Equations 5, 6, and 7, the following embodiments of the PCIM method 100 are described. Further, the network described herein is presumed to be a heterogeneous network, such as the HetNet network 200 of FIG. 3. Nevertheless, other wireless networks, such as homogeneous networks (consisting only of macro eNBs), that operate under the LTE specification may also employ the PCIM method 100.

Embodiment 1

The PCIM method 100 includes a first embodiment that can be employed when the operators and/or network vendors (e.g., AT&T, Ericsson, or Huawei) define the number of frequency layers 90 to be monitored, given by $N_{freq}$. In some embodiments, the serving eNB 20 defines the number of frequency layers 90 in the normal-performance group, given by $N_{freq\_g1}$. Once the normal-performance group is known, the reduced-performance group is also known, since $N_{freq\_g2} = N_{freq} - N_{freq\_g1}$.

In some embodiments, when the normal- and reduced-performance groups are defined, the size of the normal-performance group, $N_{freq\_g1}$, and the assigned resources, $M_{Inter\_g1}$, satisfies the constraint given in Equation 7, above. The number of frequency layers 90 in the normal-performance group, $N_{freq\_g1}$, is divided by the number of measurement gaps in the normal-performance group, $M_{Inter\_g1}$, and the result is less than or equal to the total number of frequency layers multiplied by MGRP/480. Equation 7 thus puts an upper bound on the size of the normal-performance group, $N_{freq\_g1}$.

Figure 5:
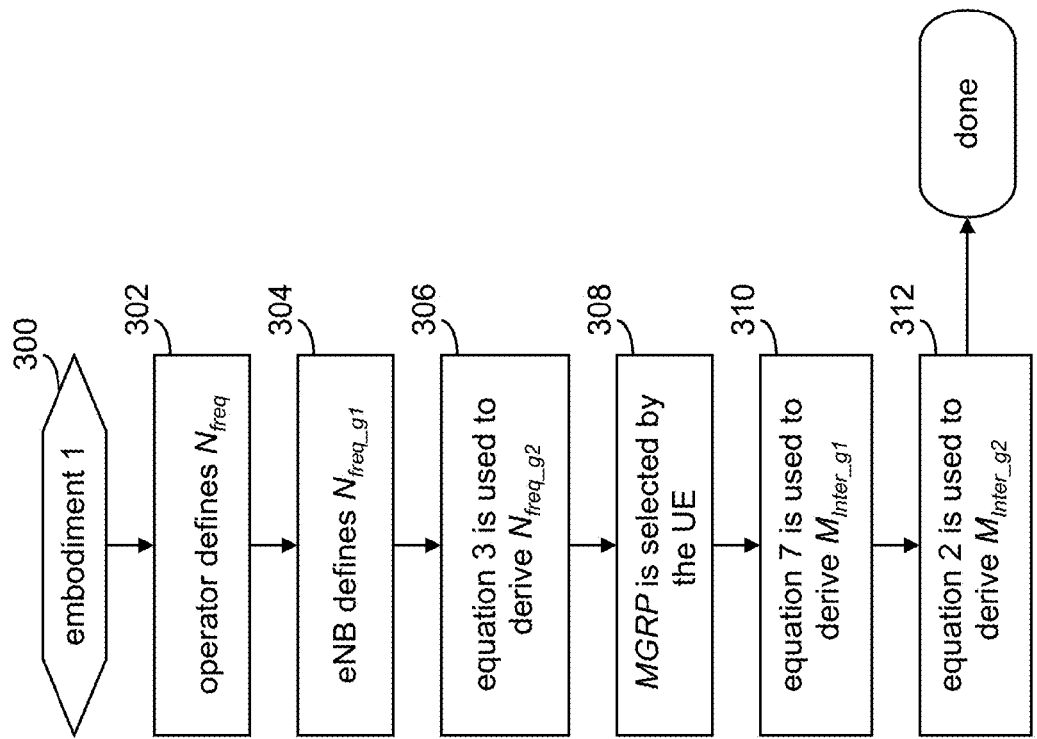
FIG. 5 is a flow diagram showing operations performed in a first embodiment of the PCIM method of FIG. 1, according to some embodiments.

The PCIM method 100, embodiment 1, is illustrated in the flow diagram of FIG. 5. The network operator defines the number of frequency layers 90 to be measured by the UE (block 302). The serving eNB 20 defines the number of frequency layers 90 in the normal-performance group (block 304). Equation 3 is used to derive the number of frequency layers 90 in the reduced-performance group (block 306). The periodicity of the measuring to be performed by the UE 50, MGRP, is selected, either 40 ms or 80 ms (block 308). This selection is made by the UE 50, by the pcell eNB 20A, or by another network entity.

Once these values are ascertained, Equation 7 is used to derive the density of the measuring taking place for the normal-performance group (block 310). Finally, Equation 2 is used to derive the density of measurement for the reduced-performance group (block 312). The operations performed by the PCIM method 100, embodiment 1, are complete.

The PCIM method 100 thus provides a design criterion to enable the eNB 20 to decide the size of the normal-performance group based on Equation 7 (with help from Equations 2 and 3).

Embodiment 2

In a second embodiment, to minimize the overall measurement delay, the PCIM method 100 assigns all frequency layers 90 to be monitored in a single group, with all resources being allocated to the same group. In some embodiments, this assignment is made by the eNB. In other embodiments, the assignment is made by the UE. This allows the UE 50 to prioritize one frequency layer over another frequency layer, for example.

In general, regardless of how normal-performance and reduced-performance groups are defined, it is desirable to reduce the overall measurement delay for each concerned inter-frequency and inter-RAT measurement. Timely measurement and reporting by the UE 50 not only facilitates network operation, but also reduces the probability of radio link failure (RLF), e.g., connection loss. This is especially the case when the serving cell coverage is weak.

The maximum cell identification delays for the high- and reduced-performance groups, respectively, are denoted as, $T_{Identify\_Inter\_g1}$ and $T_{Identify\_Inter\_g2}$, the time periods in which the UE 50 is able to identify the cell (frequency layer 90). Mathematically, an overall measurement delay, $T_{Identify\_Inter\_avg}$, an average for both groups g1 and g2, can be quantified as:

$$T_{Identify\_Inter\_avg} = T_{Identify\_Inter\_g1} \cdot \frac{N_{freq\_g1}}{N_{freq}} + T_{Identify\_Inter\_g2} \cdot \frac{N_{freq\_g2}}{N_{freq}} \quad (9)$$

Recall also that the physical layer measurement periods for the high- and reduced-performance groups, respectively, denoted as, $T_{measurement\_Period\_Inter\_FDD\_g1}$ and $T_{measurement\_Period\_Inter\_FDD\_g2}$, are time periods in which the UE 50 measures the characteristics (RSRP and RSRQ) of the identified frequency layers 90. Mathematically, an overall physical layer measurement period, $T_{measurement\_Period\_Inter\_FDD\_avg}$, an average for both groups g1 and g2, can be quantified as:

$$T_{Measurement\_Period\_Inter\_FDD\_ave} = \quad (10)$$
$$T_{Measurement\_Period\_Inter\_FDD\_g1} \cdot \frac{N_{freq\_g1}}{N_{freq}} +$$
$$T_{Measurement\_Period\_Inter\_FDD\_g1} \cdot \frac{N_{freq\_g2}}{N_{freq}}$$

Table 1 shows the results of several different normal-performance group sizes, $N_{freq\_g1}$, and how the size of the normal-performance group makes a difference in terms of the measurement delay. Thus, assuming a total number of frequency layers, $N_{freq}$, of 8, 9, 10, 11, and 12 are measured with alternating MGRPs sizes of 40 ms and 80 ms. Table 1 shows the relative measurement delay saving between the scenario when all carriers are normal-performance carriers and the scenario when the carriers are randomly assigned to either the normal-performance group or the reduced-performance group.

TABLE 1

Normal-performance group size and assignment with minimized overall measurement delay

| | $N_{freq}$ | | | | | | | | |
|---|---|---|---|---|---|---|---|---|---|
| | 8 | | 9 | | 10 | | 11 | | 12 |
| MGRP (ms) | 40 | 80 | 40 | 80 | 40 | 80 | 40 | 80 | 40 | 80 |
| $N_{freq\_g1}$ | 8 | 8 | 9 | 9 | 10 | 10 | 11 | 11 | 12 | 12 |
| $M_{Inter\_g1}$ | 12 | 6 | 12 | 6 | 12 | 6 | 12 | 6 | 12 | 6 |
| %* | 72.5 | 53.2 | 74.0 | 52.2 | 75.4 | 53.12 | 77.1 | 54.5 | 71.0 | 50 |

*$N_{freq\_g1}$ and $M_{Inter\_g1}$ are randomly selected with the constraint of $$\frac{N_{freq\_g1}}{M_{Inter\_g1}} \leq \frac{N_{freq} \cdot MGRP}{480}$$

The last row of Table 1 shows the saved measurement delay compared to randomly picked frequencies to be monitored, $N_{freq\_g1}$ and measurement gaps, $M_{inter\_g1}$, where Equation 7 is assumed. A lower percentage number is preferred. Table 1 shows that, where the MGRP is 40 ms, the lowest percentage is 71% (when $N_{freq\_g1}$=12) and when MGRP is 80 ms, the lowest percentage is 50% (also when $N_{freq\_g1}$=12). Thus, in some embodiments, the measurement delay is minimized when all frequency layers 90 are assigned to a single group, e.g., the normal-performance group, and all resources are allocated to this group.

Figure 6:
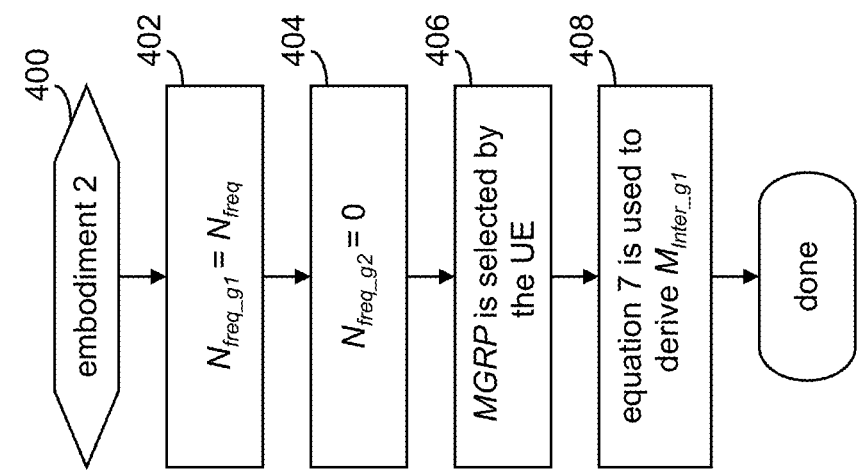
FIG. 6 is a flow diagram showing operations performed in a second embodiment of the PCIM method of FIG. 1, according to some embodiments.

The PCIM method 100, embodiment 2, is illustrated in the flow diagram of FIG. 6. All frequency layers to be measured are part of the normal-performance group (block 402). This may be done by the UE 50 or by the eNB 20. The reduced-performance group is empty (block 404). The periodicity of the measuring to be performed by the UE 50, MGRP, is selected by the UE, either 40 ms or 80 ms (block 406). Equation 7 is used to derive the density of the measuring taking place for the normal-performance group (block 408). The operations performed by the PCIM method 100, embodiment 2, are complete.

Embodiment 3

The PCIM method 100 also considers backward compatible performance of the UE 50. Embodiment 3 enables the normal-performance group, g1, to at least achieve the legacy system performance in terms of the measurement delay. Legacy UEs have fewer frequency layers (e.g., $N_{freq}$=8) to monitor than the UE 50 (e.g., $N_{freq}$=13), so the measurement delay is likely to be lower for the legacy UE.

To achieve backward compatible performances, one of the two following selections are available in embodiment 3:
   Mode 1: the normal-performance group, g1, consists of 4 frequencies with 7 measurement gaps assigned within 480 ms when MGRP=40 ms
   Mode 2: the normal-performance group, g1, consists of 5 frequencies with 4 measurement gaps assigned within 480 ms when MGRP=80 ms
If these numbers are plugged into Equation 7, the following is obtained for mode 1: 4/7≤1; in mode 2: 5/4≤2. Both equations are true. Thus, both modes 1 and 2 in Embodiment 3 satisfy Equation 7.

Core and performance backward compatibility is important for both UE 50 implementation and network operation perspectives. The existing inter-frequency/inter-RAT measurement delay requirements have been developed since RAN4 Release 8. Their robustness and sustainability have been well approved in the field. Therefore, in some embodiments, it is desirable to make sure some, if not all, of the monitored frequencies, e.g. the normal performance carriers 90, can achieve the existing minimum performance requirements, as compared to legacy UE performance, even when the number of frequencies to monitor is significantly increased. One of the two selections can be preferred, for example, when the UE 50 is moving at high speed (such as when operated in a train or other vehicle) and/or when the serving cell coverage is poor. Correspondingly, in some embodiments, the following formula shows how to make sure the normal performance carriers can achieve the legacy performance requirement:

$$T_{Identify\_Inter\_g1} = T_{Basic\_Indentify\_Inter} \cdot \frac{480}{5 \cdot M_{Inter\_g1}} \cdot N_{freq\_g1} \approx \quad (11)$$

$$T_{Basic\_Indentify\_Inter} \cdot \frac{480}{T_{Inter1}} \cdot 7 \Rightarrow$$

$$\frac{N_{freq\_g1}}{M_{Inter\_g1}} \approx \frac{7 \cdot MGRP}{480} = \begin{cases} 7/12, MGRP = 40\text{ms} \\ 7/6, MGRP = 80\text{ms} \end{cases}$$

When MGRP=40 ms, the following ($N_{freq\_g1}$, $M_{inter\_g1}$) pair can approximately achieve the existing minimum requirements:

TABLE 2

Normal-performance group characteristics when MGRP = 40 ms to achieve backward compatibility

| $N_{freq\_g1}$ | 1 | 2 | 3 | 4 | 4 | 4 | 5 | 5 | 6 | 6 |
|---|---|---|---|---|---|---|---|---|---|---|
| $M_{inter\_g1}$ | 2 | 3 | 4 | 5 | 6 | 7 | 8 | 9 | 10 | 11 |

One of the entries in Table 2, ($N_{freq\_g1}$=4, $M_{inter\_g1}$=7) is mode 1.

Similarly, when MGRP=80 ms, the following ($N_{freq\_g1}$, $M_{inter\_g1}$) pair can approximately achieve the existing minimum requirements:

TABLE 3

Normal-performance group characteristics when MGRP = 80 ms to achieve backward compatibility

| $N_{freq\_g1}$ | 2 | 4 | 5 | 6 | 7 |
|---|---|---|---|---|---|
| $M_{Inter\_g1}$ | 2 | 3 | 4 | 5 | 6 |

One of the entries in Table 3, ($N_{freq\_g1}$=5, $M_{inter\_g1}$=4) is mode 2.

In addition to the normal-performance group performance, it is also desirable to maximize the normal-performance group size, such that the UE 50 can promptly measure and report more frequencies 90 in the normal-performance group. Meanwhile, it is also important to maintain the overall measurement delay as well. As a result, in some embodiments, the corresponding group and resource assignments are recommended.

TABLE 4

Recommended group and resource assignments to maintain backward compatibility

| $N_{freq}$ | MGRP (ms) | $N_{freq\_g1}$ | $M_{Inter\_g1}$ | relative measurement delay $\frac{T_{Identify\_Inter\_g1}}{T_{Identify\_Inter\_g2}}$ | relative measurement delay $\frac{T_{Identify\_Inter\_g1}}{T_{Identify\_Inter\_r11}}$ |
|---|---|---|---|---|---|
| 8 | 40 | 4 | 7 | 0.36 | 1.07 |
| 9 | | | | 0.41 | |
| 10 | | | | 0.48 | |
| 11 | | | | 0.54 | |
| 12 | | | | 0.71 | |
| 8 | 80 | 5 | 4 | 0.36 | 1.07 |
| 9 | | | | 0.42 | |
| 10 | | | | 0.50 | |
| 11 | | | | 0.62 | |
| 12 | | | | 0.83 | |

Table 4 is based on Tables 2 and 3. The number of frequency layers 90 to be measured, $N_{freq}$, is between eight and twelve (first column). A relative measurement delay, $T_{identify\_Inter\_g1}/T_{Identify\_Inter\_g2}$, is taken for the first backward compatible selection of four frequency layers 90 in the normal-performance group, seven measurement gaps, and an MGRP of 40 ms, resulting in the first five values shown in column 5. Similarly, the relative measurement delay is taken for the second backward compatible selection of five frequency layers 90 in the normal-performance group, four measurement gaps, and an MGRP of 80 ms, resulting in the second five values shown in column 5. Column 6 includes relative measurement delays as between the normal-performance group and a legacy cell identification delay, given by $T_{identify\_Inter\_r11}$.

Figure 7:
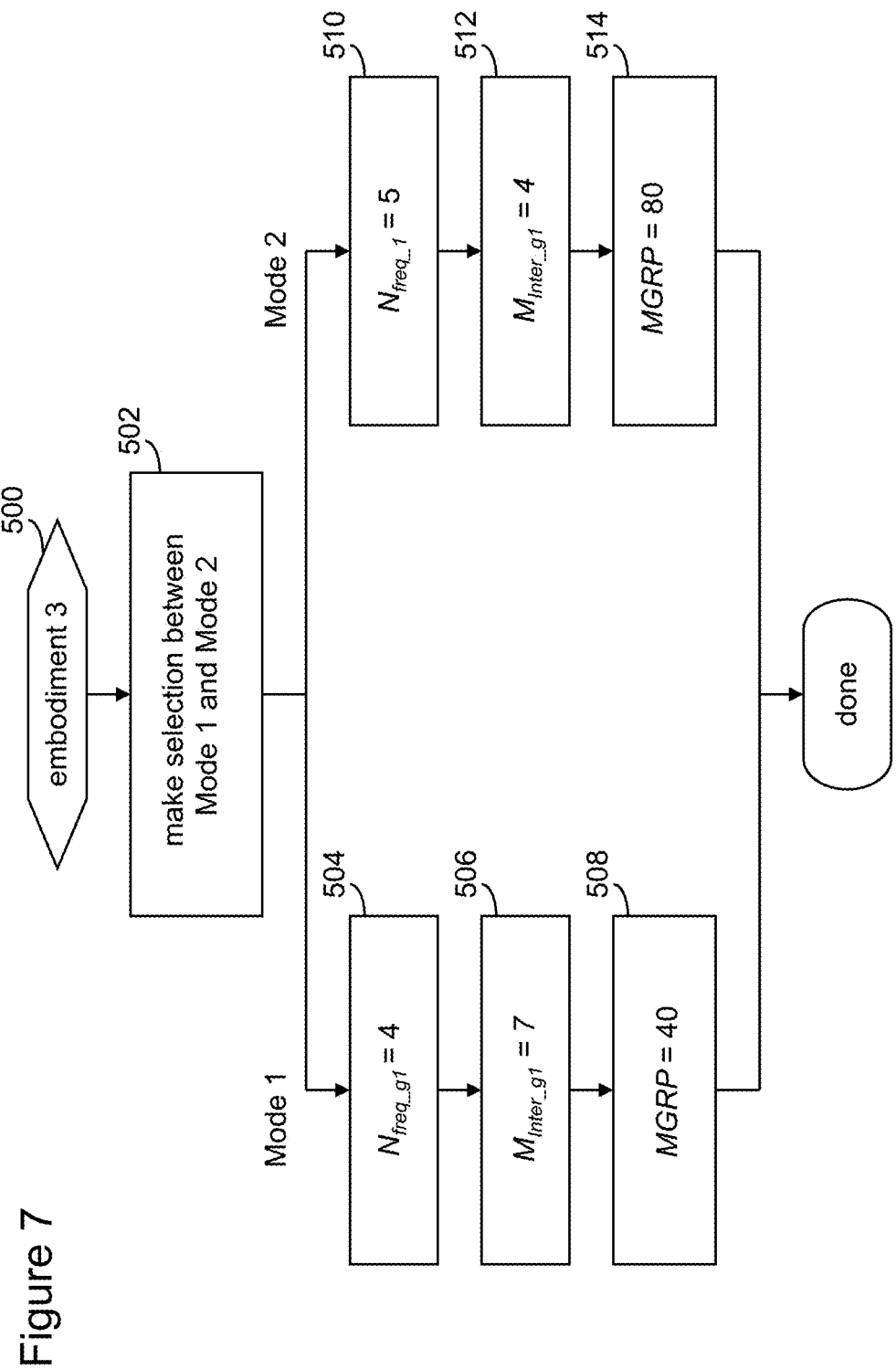
FIG. 7 is a flow diagram showing operations performed in a third embodiment of the PCIM method of FIG. 1, according to some embodiments.

The PCIM method 100, embodiment 3, is illustrated in the flow diagram of FIG. 7. A selection between mode 1 and mode 2 is made (block 502). Where mode 1 is selected, the number of frequency layers 90 in the normal-performance group is four (block 504), the number of measurement gaps in the normal-performance group is seven (block 506) per 480 ms, and the MGRP is 40 ms (block 508). The UE 50 thus has the relevant information to enable frequency layer measurements to be performed so as to achieve backwards compatibility.

Where mode 2 is instead selected, the number of frequency layers 90 in the normal-performance group is five (block 510), the number of measurement gaps in the normal-performance group is four (block 512) per 480 ms, and the MGRP is 80 ms (block 514). The UE 50 thus has the relevant information to enable frequency layer measurements to be performed so as to achieve backwards compatibility. By having two available modes in this embodiment, the system design of the UE 50 can be greatly simplified.

Embodiment 4

Theoretically, in addressing the increase in the number of frequency layers being monitored by the UE, the eNB 20 can provide a variety of different instructions to the UE 50, such as the size ($N_{freq\_g1}$) of the normal-performance group, g1, the MGRP, and the number of measurement gaps, $M_{Inter\_g1}$ and $hM_{inter\_g2}$, for each group, g1 and g2. Because of this variety, in Embodiment 4, the PCIM method 100 proposes one of three modes, discernable by a signal or bit, with each mode specifying a group size and resource assignment combination.

From a UE 50 implementation perspective, it is desirable to limit the variation of group size ($N_{freq\_g1}$) and its resource assignment ($M_{inter\_g1}$). For different group size and resource assignment combinations, a different algorithm can be used, for example, for performing the measurements. Thus, a leaner UE 50 with fewer resources can benefit from a signal that indicates one of just two possible modes.

Table 5 shows a first mode (mode 3) in which all frequency layers are assigned to the normal-performance group and the number of measurement gaps, $M_{inter\_g1}$ for the normal-performance group per 480 ms is 480/MGRP. Thus, if the MGRP is 40 ms, $M_{inter\_g1}$ is 12 and if the MGRP is 80 ms, $M_{inter\_g1}$ is 6. The reduced-performance group, g2, has no frequency layers. A signal or bit indicates to the UE 50 that mode 3 has been selected.

TABLE 5

Mode 3 group size and resource assignment

| | normal-performance group, g1 | reduced-performance group, g2 |
|---|---|---|
| group size, $N_{freq\_g1}$ | $N_{freq}$ | 0 |
| resource assignment, $M_{inter\_g1}$ | 480/MGRP | 0 |

Table 6 shows second and third modes, indicated as mode 4 and mode 5. In mode 4, the MGRP is 40 ms. In mode 4, the group size for the normal-performance group, $N_{freq\_g1}$, is four and thus the group size for the reduced-performance group is derived from this. The resource assignment (the number of measurement gaps) for the normal-performance group, $M_{inter\_g1}$, is seven and, for the reduced-performance group, the resource assignment, $M_{inter\_g2}$, is five. In Mode 5, the group size for the normal-performance group, $N_{freq\_g1}$, is seven and thus the group size for the reduced-performance group is derived from this. The resource assignment for the normal-performance group, $M_{inter\_g1}$, is four and, for the reduced-performance group, the resource assignment, $M_{inter\_g2}$, is two. In modes 4 and 5, the normal-performance group size is fixed while the total number of frequency layers remains variable.

TABLE 6

Group size and resource assignments for modes 4 and 5

| Mode | MGRP | normal-performance group, g1 | reduced-performance group, g2 |
|---|---|---|---|
| 4 | 40 ms | $N_{freq\_g1} = 4$<br>$M_{inter\_g1} = 7$ | $N_{freq\_g2} = N_{freq} - 4$<br>$M_{inter\_g2} = 5$ |
| 5 | 80 ms | $N_{freq\_g1} = 5$<br>$M_{inter\_g1} = 4$ | $N_{freq\_g2} = N_{freq} - 5$<br>$M_{inter\_g2} = 2$ |

In some embodiments, Modes 4 and 5 are designed to fix the size of the normal-performance group, regardless of how many frequency layers are to be monitored. The UE 50 has the Table 6 to reference when mode selection is made. When a signal is received (or a predefined bit is set), the UE 50 knows to operate according to Mode 3 (Table 5). When the signal is not received (or the bit is cleared), the UE 50 references Table 6 and operates according to either Mode 4 or Mode 5.

Figure 8:
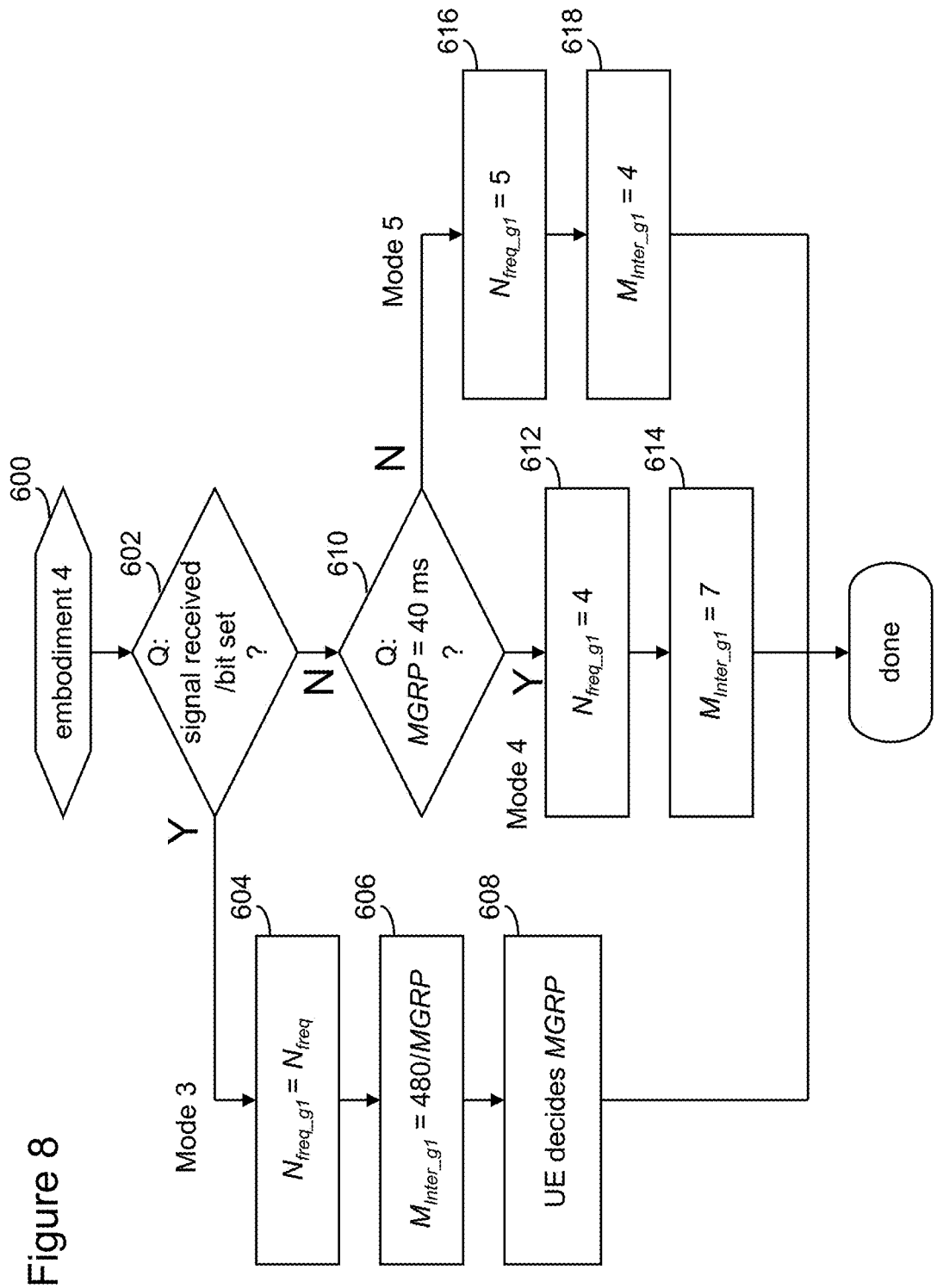
FIG. 8 is a flow diagram showing operations performed in a fourth embodiment of the PCIM method of FIG. 1, according to some embodiments.

The PCIM method 100, embodiment 4, is illustrated in the flow diagram of FIG. 8. A signal received or a bit set indicates Mode 3, while the signal not received or the bit cleared indicates Mode 4 or 5 (block 602). If Mode 3 is indicated, then all frequency layers are assigned to the normal-performance group (block 604), the resource assignment is set at 480/MGRP (block 606), and this enables the UE 50 to decide the MGRP to use (e.g., 40 ms or 80 ms) (block 608).

If the signal is not received or the bit cleared, Mode 4 or 5 is indicated. If the UE 50 decides to use an MGRP=40 ms, this indicates Mode 4 (block 610). From Table 6, the number of frequencies in the normal-performance group is 4 (block 612) and the resource assignment for the normal-performance group is 7 (block 614). If the UE 50 decides to use an MGRP of 80 ms, this indicates Mode 5. From Table 6, the number of frequencies in the normal-performance group is 5 (block 616) and the resource assignment for the normal-performance group is 4 (block 618). By having three available modes in this embodiment, the system design of the UE 50 can be greatly simplified.

Embodiment 5

Recall that the UE 50 receives a list of frequency layers to measure from the network. For example, the network can send to the UE 50 a list of ten frequency layers, band 1-band 10, but they can be sent in order of priority, say, band 7, band 3, band 4, band 8, band 2, band 1, band 10, band 9, band 5, and band 6. In some embodiments, an index to that list, given by $N_{freq\_g1}$ is sent and the index implicitly tells the UE 50 which frequency layers are in the normal-performance group, with the remaining entries belonging to the reduced-performance group.

For example, if the index is on the third entry in the list, the UE 50 automatically knows that bands 7, 3, and 4 are in the normal-performance group while bands 8, 2, 1, 10, 9, 5, and 6 are in the reduced-performance group.

Further, in some embodiments, a one-bit signal indicates to the UE 50 the group size, $N_{freq\_g1}$, and the resource assignment, $M_{inter\_g1}$, combination. In a first mode, Mode 6, there is only one group, the normal-performance group, g1. Otherwise, either Mode 7 or Mode 8 applies, with the group size $N_{freq\_g1}$, and the resource assignment, $M_{inter\_g1}$, for the normal-performance group being fixed. For both modes 7 and 8, Table 6 provides the group size and resource assignment values, based on the MGRP.

In summary, Embodiment 5 provides the following:
A single measurement list is provided to the UE:
   No explicit normal-performance and reduced-performance groups are separately provided to the UE
The frequencies in the measurement list are prioritized in decreasing order
A one-bit signaling is introduced to indicate to the UE 50 the group size and resource assignment combination mode:
   In mode 6: there is only one group (i.e., normal-performance group)
   In modes 7 and 8: the size and resource assignment for the normal-performance group is fixed. The exact values depend on the MGRP, given in Table 6

Figure 9:
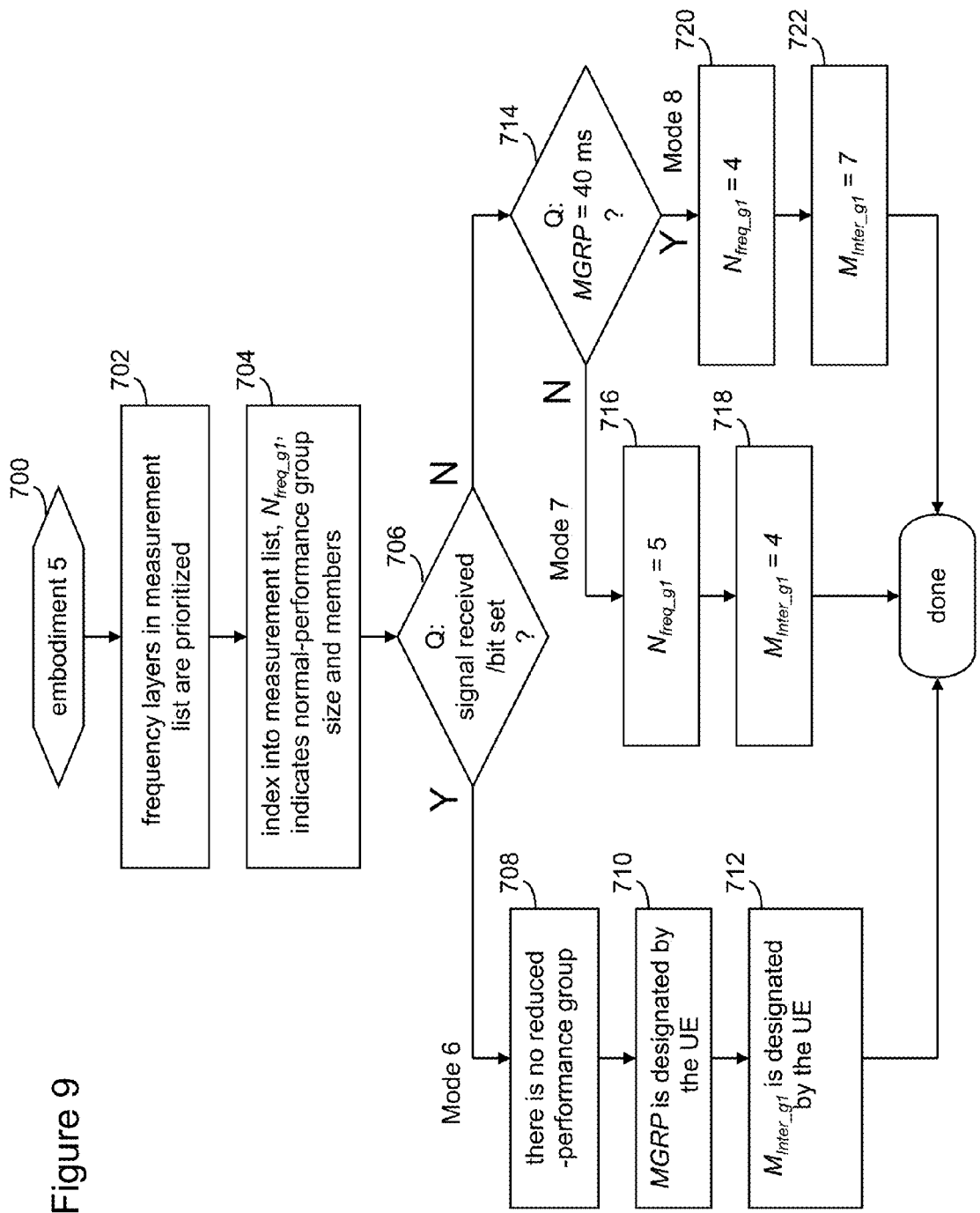
FIG. 9 is a flow diagram showing operations performed in a fifth embodiment of the PCIM method of FIG. 1, according to some embodiments.

The PCIM method 100, embodiment 5, is illustrated in the flow diagram of FIG. 9. A measurement list consisting of a prioritized list of frequency layers to be measured is supplied to the UE 50 (block 702). An index into the measurement list, $N_{freq\_g1}$, indicates which of the frequency layers is part of the normal-performance group (block 704). If a signal is received or a bit is set, the UE 50 performs the measurements in Mode 6 (block 706), in which there is no reduced-performance group (block 708), and both the MGRP (block 710) and the resource assignment (block 712) are designated by the UE 50.

If instead the signal is not received or the bit is cleared (block 706), the UE 50 operates according to Table 6, above, in either Mode 7 or Mode 8. If the MGRP is not 40 ms (block 714), the UE 50 operates in Mode 7. The number of frequency layers in the normal-performance group is five (block 716) and the resource assignment is four (block 718). Otherwise, the MGRP is 40 ms (block 714) and the number of frequency layers in the normal-performance group is four (block 720) and the resource assignment is seven (block 722). By having three available modes in this embodiment, the system design of the UE 50 can be greatly simplified.

Embodiment 6

Embodiment 6 is well-suited to situations in which the UE 50 is moving at high speeds. In Embodiment 6, the UE 50 is able to dynamically change the high- and reduced-performance group designations. If moving at high speeds, the UE 50 can move the frequency layers and measurement requirements to the reduced-performance group. By adapting the assignment of frequency layers according to the UE speed, the measurement delay at the normal-performance group becomes manageable, in some embodiments. For example, in a situation where the UE 50 is moving at high speeds, such as on a high-speed train, the measurements are needed faster than for a UE sitting in an idle position. Thus, the size of the normal-performance group can be purposely reduced under this circumstance.

In some embodiments, the UE 50 can have the capability to implement any or all of the embodiments described herein. In other embodiments, the UE 50 is limited in capability to very few of the above embodiments. Practically speaking, the UE 50 is likely to adopt one of the embodiments at an initialization stage, and thereafter does not change. There can be circumstances, however, when it makes sense for the UE 50 to change its configuration, such as in Embodiment 6 when the UE 50 is moving at high speeds. In any case, if made by the UE, any change in configuration is semi-static, in some embodiments, as there is signaling overhead associated with such a change.

Figure 10A:
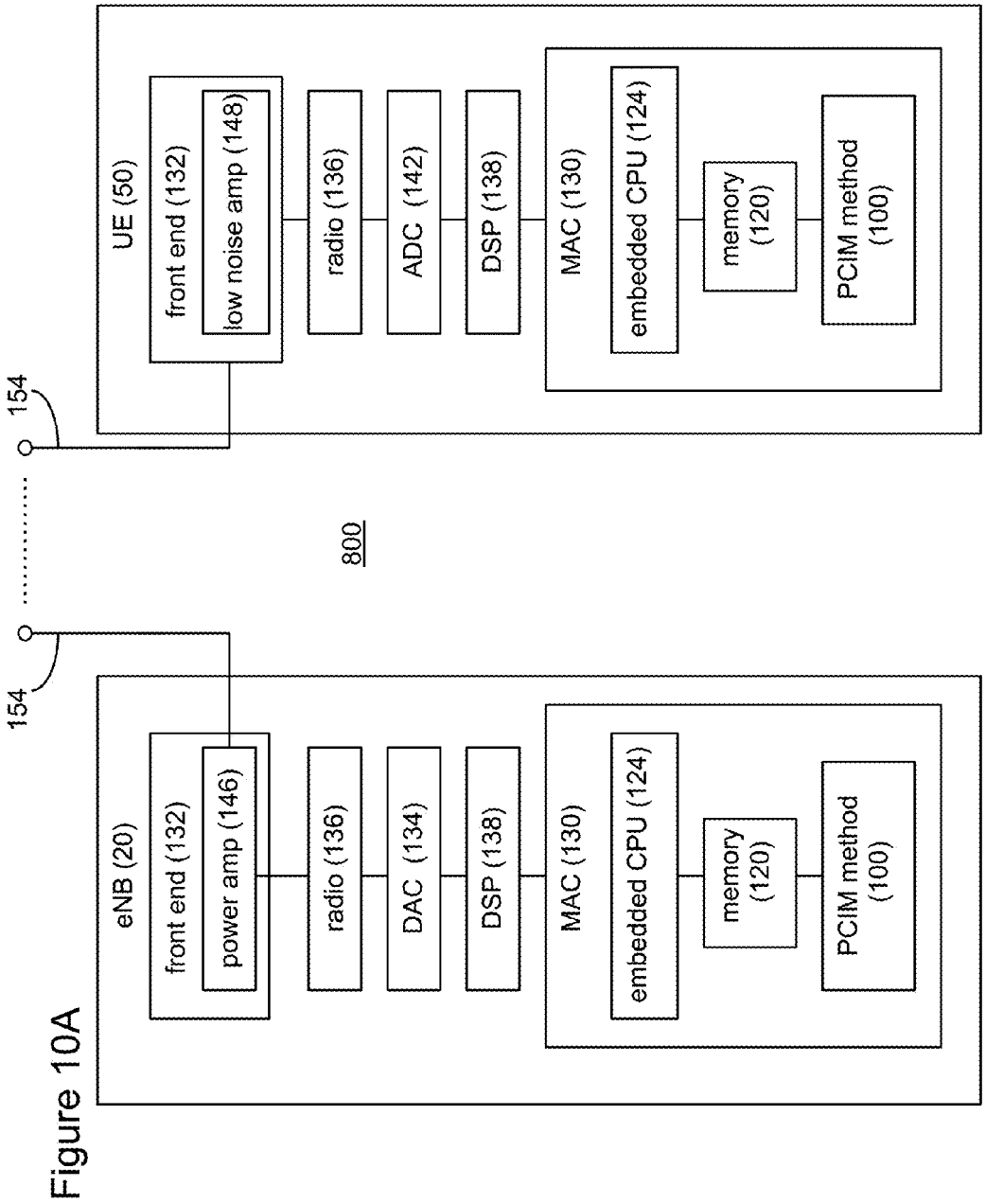
FIGS. 10A and 10B are simplified system diagrams of a wireless neighborhood featuring an enhanced node B and an user equipment, both of which are implementing the PCIM method of FIG. 1, according to some embodiments.
Figure 10B:
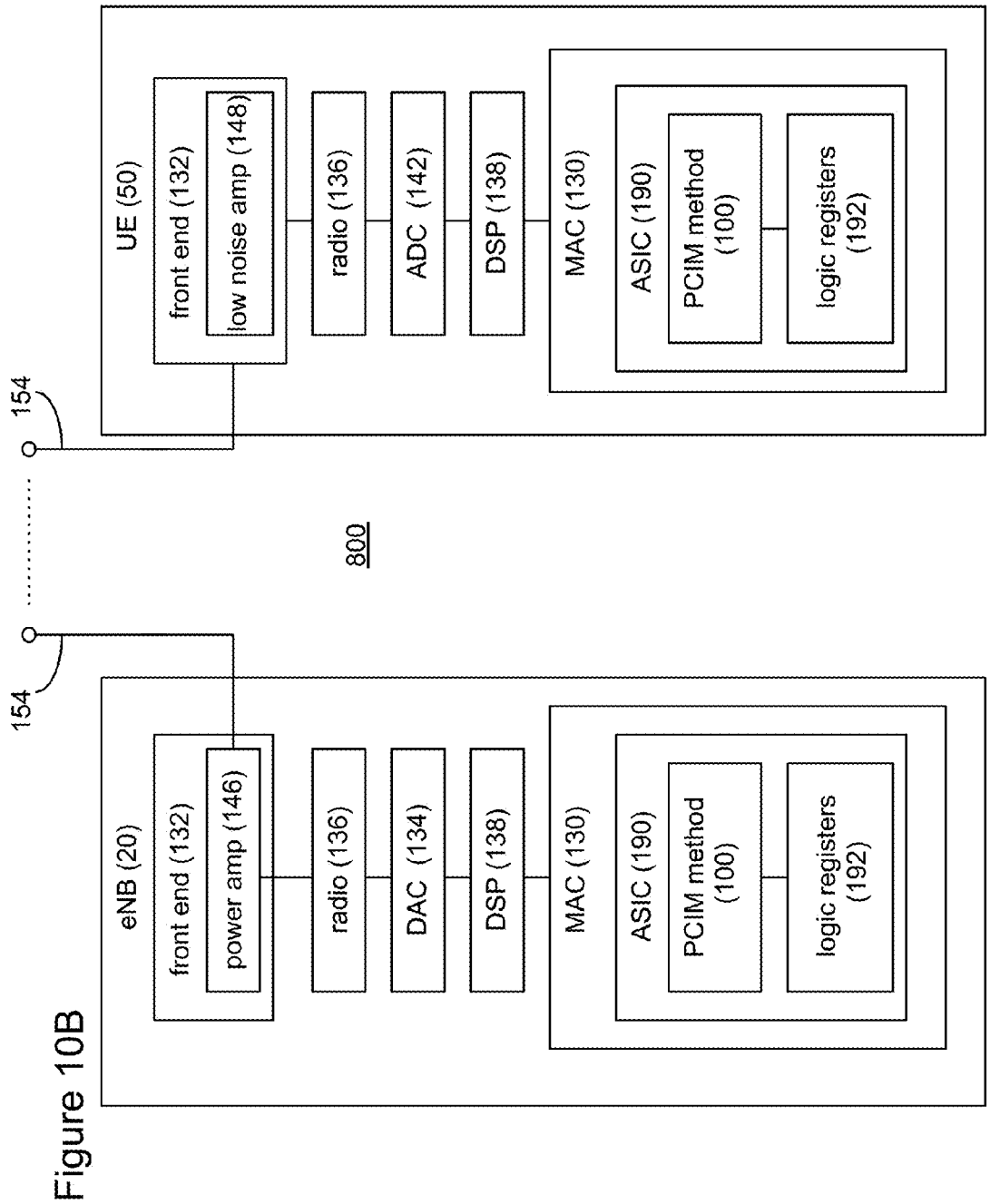

FIGS. 10A and 10B are simplified block diagrams of a wireless neighborhood 800 including the eNB 20 and the UE 50, both of which are transceivers. The eNB 20 and the UE 50 employ the above-described PCIM method 100, according to some embodiments. In this example, the eNB 20 operates as a transmitter and the UE 50 operates as a receiver. FIG. 10A shows a software-based version of the eNB 20 and the UE 50 while FIG. 10B shows an ASIC-based version.

Looking first at FIG. 10A, each device includes an antenna 154, a front-end 132, a radio 136, a baseband digital signal processor (DSP) 138, and a medium access controller (MAC) 130. Although both devices have the hardware shown in each device, the eNB 20 is shown having a power amplifier 146 in its front-end 132 while the UE 50 includes a low noise amplifier 148 in its front-end. The eNB 20 includes a digital-to-analog converter (DAC) 134 while the UE 50 includes an analog-to-digital converter (ADC) 142. The UE 50 can be virtually any wireless device, such as a laptop computer, a cellular phone, or other wireless system, and can operate as a transmitter (transmit mode) or as a receiver (receive mode).

The MAC 130 includes an embedded central processing unit (CPU) 124 and a data memory 120, such that the PCIM method 100, some portion of which is software-based, in some embodiments, can be loaded into the memory and executed by the CPU. The depiction of FIG. 10A is a simplified representation of the MAC 130, and other devices, circuits, and logic elements that can be part of the MAC are omitted.

The MAC 130 interfaces with logic devices that are commonly found in transmitters and receivers: the front-end 132, the DAC 134, the ADC 142, the radio 136, and the DSP 138. The devices 132, 134, 136, 138, and 142 are also known herein as target modules. The target modules, as well as the logic devices within the MAC 130, can consist of hardware, software, or a combination of hardware and software components.

The target modules are commonly found in most transmitters and receivers. The FE 132 is connected to the antenna 154, and includes a power amplifier (PA) (for the transmitter), a low noise amplifier (LNA) (for the receiver), and an antenna switch (not shown), for switching between transmitter and receiver modes. The DAC 134 is used to convert the digital signal coming from the DSP 138 to an analog signal prior to transmission via the radio (transmitter); conversely, the ADC 142 is used to convert the analog signal coming from the radio to a digital signal before processing by the DSP 138 (receiver). At the eNB 20, the radio 136 transfers the signal from base-band to the carrier frequency; at the UE 50, the radio 136 transfers the signal from carrier frequency to base-band. At the UE 50, the DSP 138 demodulates the OFDM signal from the ADC 142, for processing by the MAC 130. At the eNB 20, the DSP 138 modulates the MAC data into an OFDM signal in base-band frequency, and sends the resulting signal to the DAC 134.

A typical transmit operation occurs as follows: at the eNB 20, the MAC 130 sends a packet to the DSP 138. The DSP 138 converts the packet into a digital OFDM signal and sends it to the DAC 134. The DAC 134 converts the signal into an analog signal, and sends the signal to the radio 136. The radio 136 modulates the base-band signal to the carrier frequency and sends the signal to the power amplifier 146 of the front-end 132, which amplifies the signal to be suitable for over-air transmission via the antenna 154.

At the UE 50, the signal is received by the antenna 154. The weak analog signal is received into the low noise amplifier 148 of the front-end 132, sending the amplified analog signal to the radio 136, which filters the signal according to the selected frequency band and demodulates the carrier frequency signal into a base-band signal. The radio 136 sends the analog signal to the ADC 142, which converts the analog signal to a digital signal, suitable for processing by the DSP 138. The DSP 138 demodulates the OFDM signal and converts the signal to MAC 130 packet bytes. Other operations, such as encryption and decryption of the packets, are not shown. Where the transmission is successful, the packet received by the MAC 130 in the UE 50 is the same as the packet transmitted by the MAC 130 in the eNB 20.

In other embodiments, as depicted in FIG. 10B, the eNB 20 and the UE 50 do not include a CPU 124 in the MAC 130. Instead, an application-specific integrated circuit (ASIC) 190 can drive the PCIM method 100 as a state machine implemented using logic registers (192). The ASIC solution of FIG. 10B can be preferred over the MAC-based implementation of FIG. 10A, for example, in systems in which low power consumption is important.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A non-transient computer-readable medium containing programming instructions executable by a processor which, when executed, perform the following operations:

measuring, by an user equipment (UE) to operate in a wireless neighborhood comprising at least one enhanced node B (eNB) transceiver, frequency layers in a group, the size of the group being the number of frequency layers, Nfreq_g1, assigned to the group, the measuring to take place according to a measurement gap repetition period (MGRP) to be determined by the UE; and obtaining a second number of measurement gaps, Minter_g1, to enable measurements of frequency layers assigned to the group, wherein Minter_g1 is to be derived from the size of the group and the MGRP;

wherein Minter g1, is to be obtained using the following formula $$\frac{N_{freq\_g1}}{M_{Inter\_g1}} \leq \frac{N_{freq} \cdot MGRP}{480}.$$

2. The non-transient computer-readable medium of claim 1, wherein the group size, Nfreq_g1, is less than a total number of frequency layers, Nfreq, to be measured by the UE.

3. The non-transient computer-readable medium of claim 1, wherein the group does not include a serving frequency layer between the UE and its serving eNB.

4. The non-transient computer-readable medium of claim 1, wherein the group comprises a frequency layer between the UE and other base stations in the wireless neighborhood.

5. The non-transient computer-readable medium of claim 1, wherein the group comprises a frequency layer within the current radio access technology (RAT) in which the UE operates.

6. The non-transient computer-readable medium of claim 5, wherein the group comprises a frequency layer between the eNB and a second UE in the wireless neighborhood.

7. The non-transient computer-readable medium of claim 5, wherein the group comprises a frequency layer between a second UE and a second eNB in the wireless neighborhood.

8. The non-transient computer-readable medium of claim 1 wherein the wireless neighborhood is a heterogeneous network comprising entities operating in a radio access technology (RAT) of the UE and other entities operating in a different RAT from the UE.

9. The non-transient computer-readable medium of claim 8, wherein one or more of the frequency layers in the group is outside the current RAT of the UE.

10. The non-transient computer-readable medium of claim 1, wherein the group comprises a frequency layer between the UE and a second UE in the wireless neighborhood.

11. The non-transient computer-readable medium of claim 1, wherein the group size, Nfreq_g1, is identical to a total number of frequency layers, Nfreq, to be measured by the UE.

12. An user equipment (UE) to be used in a wireless network, comprising:
a communication module to receive, from an evolved NodeB (eNB) in the wireless network, a number of frequency layers, Nfreq_g1, assigned to a group and a second number of measurement gaps, Minter_g1, for which measurements of frequency layers assigned to the group are to be performed, the UE to measure the frequency layers in the group according to a measurement gap repetition period (MGRP) to be determined by the UE;
wherein Minter_g1 is to be derived from the size of the group and the MGRP;
wherein Minter g1, is to be obtained using the following formula $$\frac{N_{freq\_g1}}{M_{Inter\_g1}} \leq \frac{N_{freq} \cdot MGRP}{480}.$$

13. The UE of claim 12, wherein the frequency layers in the group do not include a serving frequency layer between the UE and its serving eNB.

14. The UE of claim 12, wherein the group comprises a frequency layer selected from a group consisting of:
a frequency layer between the UE and a second eNB;
a frequency layer within the current radio access technology (RAT) in which the UE is to operate;
a frequency layer between the eNB and a second UE;
a frequency layer between a second UE and a second eNB;
a frequency layer outside the current radio access technology of the UE; and
a frequency layer between the UE and a second UE.

15. The UE of claim 12, wherein the number of frequency layers, Nfreq_g1, is identical to a total number of frequency layers, Nfreq, to be measured by the UE.

* * * * *